US009645030B2

(12) United States Patent
Eriksen

(10) Patent No.: US 9,645,030 B2
(45) Date of Patent: May 9, 2017

(54) PRESSURE MEASUREMENT SENSOR HEAD

(71) Applicant: Tool Tech AS, Rykkinn (NO)

(72) Inventor: Egil Eriksen, Vassenden (NO)

(73) Assignee: Electrical Subsea & Drilling AS, Straume (NO)

(*) Notice: Subject to any disclaimer, the term of this patent is extended or adjusted under 35 U.S.C. 154(b) by 131 days.

(21) Appl. No.: 14/400,658

(22) PCT Filed: May 8, 2013

(86) PCT No.: PCT/NO2013/050084
§ 371 (c)(1),
(2) Date: Nov. 12, 2014

(87) PCT Pub. No.: WO2013/172717
PCT Pub. Date: Nov. 21, 2013

(65) Prior Publication Data
US 2015/0135843 A1  May 21, 2015

(30) Foreign Application Priority Data

May 13, 2012 (NO) .................................. 20120552
Mar. 25, 2013 (NO) .................................. 20130426

(51) Int. Cl.
G01L 9/04 (2006.01)
G01L 19/06 (2006.01)
G01L 9/00 (2006.01)

(52) U.S. Cl.
CPC .............. *G01L 9/04* (2013.01); *G01L 9/0051* (2013.01); *G01L 19/0618* (2013.01)

(58) Field of Classification Search
CPC ...... G01L 9/04; G01L 9/0051; G01L 19/0618
(Continued)

(56) References Cited

U.S. PATENT DOCUMENTS 3,335,381 A * 8/1967 Di Giovanni ......... G01L 1/2231
338/4
3,559,488 A * 2/1971 Weaver ................. G01L 9/0052
73/720
(Continued)

FOREIGN PATENT DOCUMENTS

EP     1146326 A2    10/2001
GB      238235 A     7/1971
(Continued)

OTHER PUBLICATIONS

Written Opinion of the International Searching Authority dated Oct. 2, 2013 for Application No. PCT/NO2013/050084.
(Continued)

*Primary Examiner* — Lisa Caputo
*Assistant Examiner* — Nathaniel T Woodward
(74) *Attorney, Agent, or Firm* — Patterson & Sheridan LLP

(57) ABSTRACT

Device for measurement of fluid pressure by means of an arrangement of strain gauges provided on a sensor head arranged on an item arranged to be exposed to a pressurized fluid against an external sensor head surface, where the sensor head comprises a fastening portion attached to the item, and a center portion connected to the fastening portion by means of at least one flexible connecting element, the arrangement of strain gauges is attached to the center portion of the sensor head on an internal assembly surface arranged in close proximity to a contact face on an end stopper which in an active condition encircles the arrangement of strain gauges, and the assembly surface is inexposable for the pressurized fluid.

7 Claims, 2 Drawing Sheets

Figure 1:
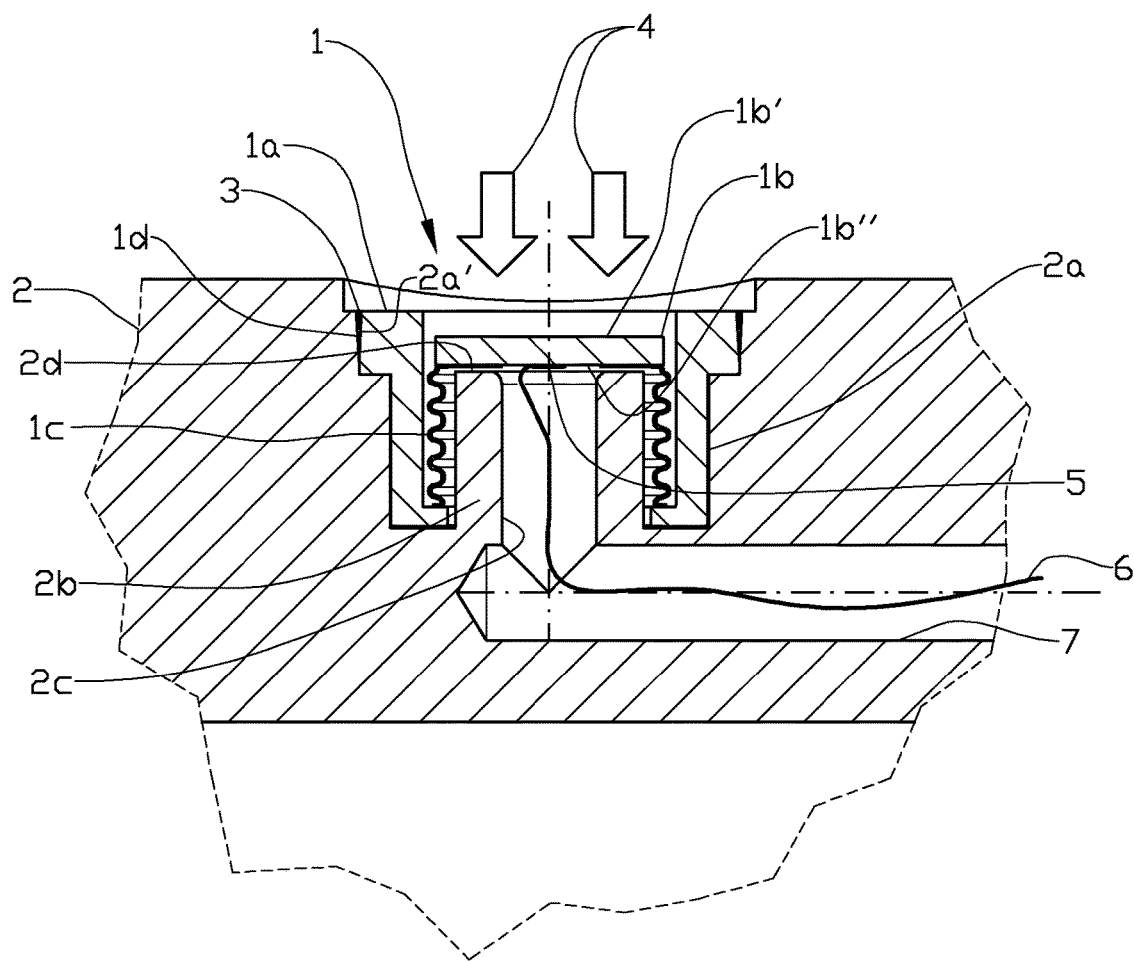

(58) Field of Classification Search
USPC .......................................................... 73/720
See application file for complete search history.

(56) References Cited

U.S. PATENT DOCUMENTS

| | | | |
|---|---|---|---|
| 4,102,210 A * | 7/1978 | Couston ................ | G01L 9/0051 338/4 |
| 4,586,018 A * | 4/1986 | Bettman ............. | G01L 19/0645 338/2 |
| 5,315,878 A * | 5/1994 | Birenheide ........... | G01L 9/0051 200/83 N |

FOREIGN PATENT DOCUMENTS

| | | |
|---|---|---|
| GB | 2202052 A | 9/1988 |
| JP | 2002-228531 A | 8/2002 |

OTHER PUBLICATIONS

International Preliminary Report on Patentability dated Mar. 14, 2014 for Application No. PCT/NO2013/050084.

\* cited by examiner

PRESSURE MEASUREMENT SENSOR HEAD

The present invention concerns a device for measuring fluid pressure by means of an arrangement of strain gauges provided on a sensor head arranged on an item arranged to be exposed to a pressurized fluid against an exterior sensor head surface.

A strain gauge is a device used for measuring very small deformations in a surface to which the strain gauge is attached, that is deformations appearing in the order of size of a few µm. Such small deformations are due to the bending, stretching, compression and twisting of a solid body. Strain gauges are coupled into measuring bridges which are connected to an apparatus registering changes in electrical resistance in the strain gauges. The measured values are translated into readings of the forces acting on the contact surface to which the strain gauges are connected. A method for measuring a pressure influencing an item, for example inside of a pipe, is to place strain gauges on the outside of the pipe in order to measure the force acting on the pipe wall from the pressure of a fluid in the pipe. In order to avoid that mechanical forces other than those produced by the fluid pressure are to influence on the pressure measurement, a solution which prevents transfer of forces due to bending, stretching, pressure and twisting of the item, to the contact surface to which the strain gauges are attached, is required.

EP 1146326 A2 discloses a pressure sensor based on strain gauges. A pressure detecting element is connected to a recess provided with a bore being in pressure communication with the interior of the pressure detecting element. A fastening element which goes into engagement with a threaded portion of the wall of the recess, is bearing supportively against a projected end portion of the pressure detecting element.

JP 2002-228531 A discloses a pressure sensor where the pressure sensitive portion consists of a membrane and a membrane support portion arranged in a housing. A cylindrical, outwardly protruding portion integral with the housing is arranged on the pressure side in order to guide an initial pressure to the periphery of the membrane.

An o-ring constitutes a packer between the protruding portion and the membrane support portion.

The present invention has for its object to remedy or to reduce at least one of the disadvantages of the prior art or at least to provide a useful alternative to prior art.

The object is attained by features in accordance with the description below and the subsequent claims.

The present invention provides a sensor head comprising an assembly surface for an arrangement of strain gauges, the assembly surface being provided on a centre portion connected to an encircling fastening portion attached to an item which is exposed to compressive forces from a fluid, the connection between the centre portion and the fastening portion being provided in such a way that a deformation of the fastening portion provided by twisting, bending, compression or stretching of the item is not transferred to the centre portion. This is attained by the connection of the centre portion to the fastening portion through one or more flexible connection elements in such a way that the periphery of the assembly surface which is arranged inside of the centre portion, abuts supportively against an end surface of an end stopper, typically formed as a circular, upwardly protruding portion of the item, when an outer sensor head surface is exposed to a fluid pressure exceeding the level which the flexible connection element can withstand. Thus the flexible connection elements are unloaded, and a permanent destruction of the sensor head caused by high fluid pressure, is avoided. A deformation of the centre portion provided by the fluid pressure is registered by the strain gauges arranged in a mid-portion of the assembly surface within the supportive end surface. The registration of the deformation may be done both when the centre portion is clear of the end stopper and when the centre portion rests on the end stopper.

The strain gauges are connected to a distant apparatus for registration and possible processing of the measuring results through one or more cables extending through a centre bore in the upwardly protruding end stopper and an adjacent channel in the item, which is both fluid- and pressurewise separated from the pressurized fluid influencing the exterior sensor head surface.

The objects of the invention are to provide a sensor head for pressure measurement without any fluid-communicating passages to the pressurized fluid, and connected to the item in a way which prevents forces from the item in which the sensor head is integrated, to be transmitted to the centre portion of the sensor head with the strain gauges which are to measure the influence of the pressure, and a solution protecting the sensor head against destruction when the fluid pressure exceeds the measure range which the sensor head is dimensioned for.

A main aspect of the solution is that the strain gauges may be added directly to the interior assembly surface by means of thin-film technology, as the strain gauges are protected inside of the sensor head without any direct contact with the pressurized fluid and in a chamber providing sufficient room for the strain gauges and the connected cables.

The invention more specifically concerns a device for measurement of fluid pressure by means of an arrangement of strain gauges provided on a sensor head arranged on an item arranged to be exposed to a pressurized fluid against an external sensor head surface, characterised in that the sensor head comprises a fastening portion attached to the item, and a centre portion connected to the fastening portion by means of at least one flexible connecting element, the arrangement of strain gauges is attached to the centre portion of the sensor head on an internal assembly surface arranged in close proximity to a contact face on an end stopper which in an active condition encircles the arrangement of strain gauges, and the assembly surface is inexposable for the pressurized fluid.

The end stopper may be formed as an upwardly protruding portion in a circular recess in the item.

The end stopper may be ring-shaped, as a central bore forms an extension of a fluid sealing, elongated cable channel.

The fastening portion may be fixed to a complementary upper portion of the recess with a fluid sealing means.

The fluid sealing means may be a welded joint formed by means of electron beam welding along an outer edge of the fastening portion of the sensor head.

The contact face may be ring-shaped.

Figure 3:
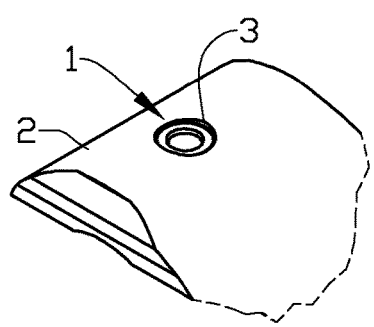
Figure 2:
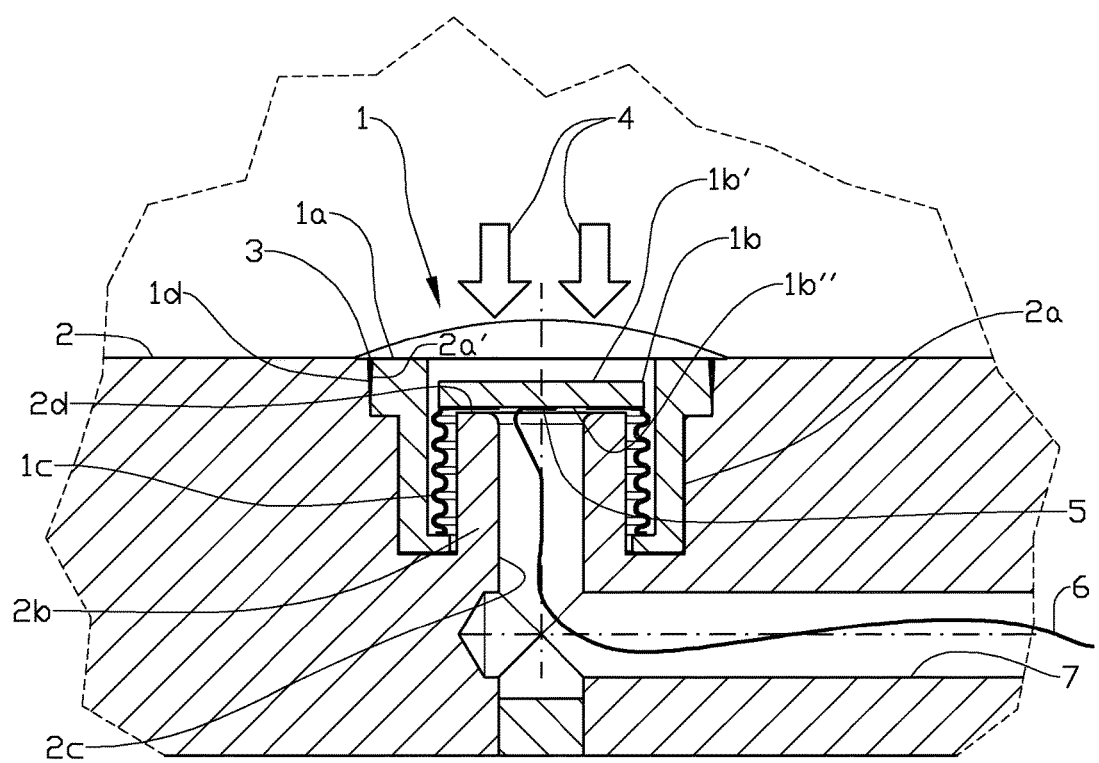
Figure 4:
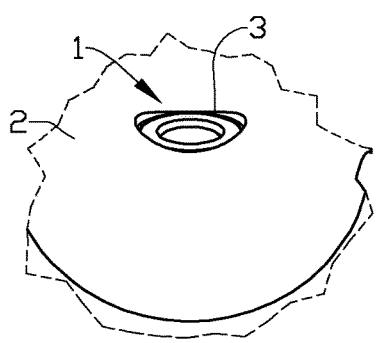

In the following an example of a preferred embodiment which is illustrated in the enclosed drawings, is described, where:

FIGS. 1 and 2 represent a schematic cross-section from the side of sensor heads for measurement of pressure acting respectively on the outside and on the inside of a tubular item; and FIGS. 3 and 4 show a perspective view of the sensor heads mounted respectively on the outside and on the inside of the tubular item.

A sensor head 1 is inserted in a recess 2a in an item 2, typically in the wall of a tube. A projected fastening portion 1a is connected to a complementary upper portion 2a' of the recess 2a by a fluid sealing means 3, for example by a welded joint formed by means of electron beam welding along an outer edge 1d of the fastening portion 1a of the sensor head 1. A circular centre portion 1b of the sensor head 1 is flexibly connected to the fastening portion 1a through a flexible connecting element 1c, for example formed as a bellows or another folded, mechanical connection. The centre portion 1b and the connecting element 1c are allowed to move within the clearances between the sensor head 1 and the recess 2a in the item 2. If the pressure of a pressurized fluid 4 exceeds the level which the flexible connecting element 1c may withstand, the centre portion 1b is pushed into abutment against a circular contact face 2d of an end stopper 2b protruding upwardly in the recess 2a of the item 2. The abutment against the end stopper 2b will prohibit further compression of the sensor head 1, for example destructive compression of the connecting element.

The connecting element 1c is fluid sealing in order to prohibit an interior assembly surface 1b" on the centre portion 1b of the sensor head 1 to be exposed to the pressurized fluid 4.

On a mid-portion of the interior assembly surface 1b" opposite an exterior sensor head surface 1b' which is exposed to the pressurized fluid 4, an arrangement of strain gauges 5 configured in a measuring bridge of type known per se, is connected. Cables 6 from the strain gauges 5 are led through the centre bore 2c in the upwardly protruding end stopper 2b and further through a connected channel 7 in the item 2 to an apparatus (not shown) for registering and processing of the measuring results. The centre bore 2c and the channel 7 are in a fluid sealing way separated from the pressurized fluid 4.

The fastening of the fastening portion 1a in the item 2 and the connection between the fastening portion 1a and the centre portion 1b of the sensor head is fluid tight so that the fluid pressure from the fluid 4 does not transmit to the interior of the sensor head 1.

When the sensor head 1 is exposed to a fluid pressure 4 against the exterior sensor head surface 1b', the strain gauges 5 register a deformation in the interior assembly surface 1b" of the centre portion 1b, as the strain gauges 5 are prolonged due to an inwardly bending of the centre portion 1b. The flexible connection element 1c prohibits tensions generated in the item due to twisting, bending, compression or stretching, from influencing on the strain gauges 5. If the sensor head 1 is exposed to larger pressure than that which the flexible connection element 1c may absorb, the centre portion 1b is pushed to abutment against the circular contact face 2d on the end stopper 2b. A further rise in pressure could thus be measured without risking destruction of components in the sensor head 1. A change of measurement characteristics for the strain gauges 5 due to change of geometrical conditions by inwardly displacement of the support of the centre portion 1b from the joint area between the centre portion 1b and the connection element 1c to the resulting support between the end stopper 2b and the assembly surface 1b", may be taken into consideration on processing of the measuring results.

The invention claimed is:

1. A device for measurement of fluid pressure, the device comprising:
    an item exposable to a pressurized fluid, the item comprising an end stopper having a contact face,
    the sensor head comprising a fastening portion attached to the item and a centre portion connected to the fastening portion by at least one flexible connecting element, the sensor head being connected to the item by the fastening portion such that the centre portion is spaced from the contact face of the end stopper, the at least one flexible connecting element configured to move the centre portion into abutment against the contact face if the pressurized fluid exceeds a threshold level,
    an arrangement of strain gauges attached to an internal surface of the centre portion of the sensor head in close proximity to the contact face of the end stopper, the arrangement of strain gauges being spaced from the at least one flexible connecting element, the end stopper encircling the arrangement of strain gauges, the arrangement of strain gauges being configured to measure fluid pressure when the sensor head is spaced from the contact face of the end stopper,
    wherein the internal surface of the centre portion of the sensor head is not exposed to the pressurized fluid.

2. The device in accordance with claim 1, wherein the end stopper is an upwardly protruding portion in a circular recess of the item.

3. The device in accordance with claim 1, wherein the item comprises a fluid sealing elongated cable channel and the end stopper is ring-shaped with a central bore, the central bore forming an extension of the fluid sealing elongated cable channel.

4. The device in accordance with claim 1, wherein the item comprises a recess and the fastening portion of the sensor head is fixed to a complementary upper portion of the recess with a fluid sealing means.

5. The device in accordance with claim 4, wherein the fluid sealing means is a welded joint formed by electron beam welding an outer edge of the fastening portion of the sensor head.

6. The device in accordance with claim 1, wherein the contact face of the end stopper is ring-shaped.

7. The device in accordance with claim 1, wherein the at least one flexible connecting element encircles the end stopper.

* * * * *